US011153646B2

(12) United States Patent
Shetty et al.

(10) Patent No.: US 11,153,646 B2
(45) Date of Patent: Oct. 19, 2021

(54) APPLYING ACCESS CONTROL TO STREAMED MEDIA CONTENT

(71) Applicant: International Business Machines Corporation, Armonk, NY (US)

(72) Inventors: Rohit Shetty, Cary, NC (US); Ashrith Shetty, Belthangady (IN); Indumathy Gururao, Bangalore (IN); Logeswaran T Rajamanickam, Tirupur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/681,933

(22) Filed: Nov. 13, 2019

(65) Prior Publication Data
US 2021/0144441 A1    May 13, 2021

(51) Int. Cl.
*H04N 21/454* (2011.01)
*H04L 29/06* (2006.01)
*G06F 21/32* (2013.01)
*H04N 21/45* (2011.01)

(52) U.S. Cl.
CPC ......... *H04N 21/4542* (2013.01); *G06F 21/32* (2013.01); *H04L 63/101* (2013.01); *H04N 21/4532* (2013.01)

(58) Field of Classification Search
CPC ................................................ H04N 21/4542
See application file for complete search history.

(56) References Cited

U.S. PATENT DOCUMENTS

| | | | |
|---|---|---|---|
| 9,762,961 B2 | 9/2017 | Aronzon et al. | |
| 2015/0310698 A1* | 10/2015 | Polis | G07F 17/323 463/20 |
| 2017/0255940 A1* | 9/2017 | Kohli | G06Q 20/405 |
| 2017/0372206 A1* | 12/2017 | Kavadiki | G06Q 30/0201 |
| 2018/0070123 A1 | 3/2018 | Sharma | |
| 2018/0288115 A1 | 10/2018 | Asnis et al. | |
| 2020/0034593 A1* | 1/2020 | Maor | G06K 9/0002 |
| 2020/0151993 A1* | 5/2020 | Russ | G06K 9/00281 |
| 2020/0160612 A1* | 5/2020 | Bowen | G06F 30/20 |

FOREIGN PATENT DOCUMENTS

EP    3422727 A1    1/2019

OTHER PUBLICATIONS

IBM, "Identity and Access Management", Infuse identity everywhere—secure what matters most, IBM Industries, printed Jul. 31, 2019, 5 pages, <https://www.ibm.corn/industries/federal/cyber-security/biornetrics>.

(Continued)

*Primary Examiner* — Michael H Hong
(74) *Attorney, Agent, or Firm* — James L. Olsen (57) ABSTRACT

Aspects of the present disclosure relate to applying access control to streamed media content. A log-in request to a media streaming service is received. A biometric sample is received from a user. The biometric sample is compared to a biometric template to determine whether the user is an authorized user. In response to determining that the user is an authorized user, the biometric sample is analyzed to determine an age of the user. Access control is then applied to media content accessed through the media streaming service based on the determined age.

17 Claims, 6 Drawing Sheets

(56) References Cited

OTHER PUBLICATIONS

Unknown, "How to turn off private browsing", The Washington Post, printed Jul. 31, 2019, 3 pages <https://www.washingtonpost.com/lifestyle/2019/02/19/so-youve-got-parental-controls-now-what/?noredirect=on&utm_term=.1322770a21ee>.

Nield, D., "How to enable parental controls on Netflix, Hulu, and other streaming services", Popular Science, Oct. 27, 2018, 15 pages, <https://www.popsci.com/parental-controls-on-streaming-services/>.

Unknown, "Parents' Ultimate Guide to Parental Controls", Parental Controls, Common Sense Media, printed Jul. 31, 2019, 21 pages, <https://www.commonsensemedia.org/blog/parents-ultimate-guide-to-parental-controls>.

Wright, M., "Parental settings online failing to block violence, pornography and self-harm", Feb. 18, 2019, 4 pages, <https://www.telegraph.co.uk/news/2019/02/18/parental-settings-online-failing-block-violence-pornography/>.

Zaman et al., "Parental controls: advice for parents, researchers and industry", EU Kids Online, Feb. 2016, 10 pages,<https://www.researchgate.netpublication/301775592_Parental_controls_advice_for_parents_researchers_and_industry>.

Falohun et al., "A Fingerprint-based Age and Gender Detector System using Fingerprint Pattern Analysis", International Journal of Computer Applications, vol. 136—No. 4, Feb. 2016, pp. 43-48.

Buyuk et al., "Age Identification From Voice Using Feed-Forward Deep Neural Networks", 2018 26th Signal Processing and Communications Applications Conference (SIU), May 2-5 2018, 4 pages, English Abstract Only.

Liao et al., "Age Estimation of Face Images Based on CNN and Divide-and-Rule Strategy", Research Article, Mathematical Problems in Engineering, vol. 2018, Article ID 1712686, 9 pages.

Jana et al., "Age Estimation from Face Image using Wrinkle Features", International Conference on Information and communication Technologies (ICICT 2014), Procedia Computer Science 46 ( 2015 ), pp. 1754-1761.

Wadhwa et al., "Age and Gender Determination from Finger Prints using RVA and dct Coefficients", IOSR Journal of Engineering (IOSRJEN), vol. 3, Issue 8 (Aug. 2013), pp. 5-9.

Angulu et al., "Age estimation via face images: a survey", EURASIP Journal on Image and Video Processing (2018), 35 pages.

Pribil et al., "GMM-Based Speaker Gender and Age Classification After Voice Conversion", 2016 First International Workshop on Sensing, Processing and Learning for Intelligent Machines (SPLINE), Jul. 6-8, 2016, 5 pages.

Mell et al., "The NIST Definition of Cloud Computing", Recommendations of the National Institute of Standards and Technology, Sep. 2011, 7 pages.

* cited by examiner

APPLYING ACCESS CONTROL TO STREAMED MEDIA CONTENT

BACKGROUND

The present disclosure relates generally to the field of streamed media content, and more specifically, to applying access control to streamed media content.

Media streaming services provide media to end users without the need for the users to download media to a storage medium. Rather, the media is delivered over a network from a storage medium of the media stream service provider. Media streams are typically configured such that the media is compressed (e.g., using audio coding format or video coding format) and routed through a content delivery network (e.g., using a transport protocol, such as HTTP) to a user.

The rise in subscription media streaming services has given consumers seemingly endless media options. However, due to the sheer size of the media repositories, it's easy for children to stumble across inappropriate content. As a result, media streaming service providers have devised a variety of solutions to prevent children from watching inappropriate content. Some solutions include applying a master password to lock adult content. Some solutions include controlling access based on user profiles (e.g., adult profiles and children profiles), which may also be coupled with a password. However, in the case of passwords, if a child learns the password, they can watch any content through the service. In the case of user profiles, if a child signs into an adult user profile (by clicking on a parent's icon or by entering a learned password), they may also be allowed to watch any content.

SUMMARY

Embodiments of the present disclosure relate to a method for applying access control to streamed media content. A log-in request to a media streaming service can be received. A biometric sample can be received from a user. The biometric sample can be compared to a biometric template to determine whether the user is an authorized user. In response to determining the user is an authorized user, the biometric sample can be analyzed to determine an age of the user. Access control can then be applied to media content accessed through the media streaming service based on the determined age of the user.

The above method can provide several advantages. First, by comparing the biometric sample to a biometric template to determine whether the user is an authorized user, unauthorized users can be prevented from accessing the media streaming service. Further, by determining the age of the user based on biometric data, the user cannot bypass age restrictions as they could with conventional access control methodologies (e.g., by knowing a master password and/or accessing the content through a different user profile). Further still, because age is dynamically determined upon each log-in to the media streaming service, the content that is available to the user can differ each log-in. For example, a first set of media content could be available for the user at a first age, a second set of media content could be available to the user at a second age, etc. This can allow a seamless transition of access to permitted content for users as they are aging. In contrast, previous methods would require manual intervention to expand access to additional content. For example, a child could only have access to "For Kids" content until they reach a particular age (e.g., 18), at which point all content could be unlocked.

In some embodiments, the method can include receiving a fingerprint from the user and analyzing the fingerprint using a discrete wavelet transform (DWT) and principle component analysis (PCA) to determine the age of the user. By using a DWT/PCA analysis on a fingerprint, secure and reliable age verification can be completed.

In some embodiments, the method can further comprise determining an identity of the user based on the comparison between the biometric sample and the biometric template, browsing social media to determine a social media profile corresponding to the identity of the user, and analyzing the social media profile to ascertain the age of the user. This can be completed such that age verification can be more accurately performed. For example, this can enable narrowing down an age range determined by a biometric analysis.

In some embodiments, the method can further comprise receiving, at a later time, a second biometric sample from the user, determining by analyzing the second biometric sample, that the user is a second age, and applying, based on the second age, a second access control to media content accessed through the media streaming service. This can be completed such that, as the age of the user changes over time, the content that the user can access changes. This enables a seamless transition of access control applied to streamed media content as users age.

Embodiments of the present disclosure also relate to a system comprising a memory storing program instructions and a processor, where the processor is configured to execute the program instructions to perform a method. The method performed by the processor can include receiving a log-in request to a media streaming service. The method performed by the processor can further include receiving a biometric sample can be received from a user. The method performed by the processor can further include comparing the biometric sample to a biometric template to determine whether the user is an authorized user. In response to determining the user is an authorized user, the method performed by the processor can include analyzing the biometric sample to determine an age of the user. The method performed by the processor can then include applying access control to media content accessed through the media streaming service based on the determined age of the user.

The above system can provide several advantages. First, by comparing the biometric sample to a biometric template to determine whether the user is an authorized user, unauthorized users can be prevented from accessing the media streaming service. Further, by determining the age of the user based on biometric data, the user cannot bypass age restrictions as they could with conventional access control methodologies (e.g., by knowing a master password and/or accessing the content through a different user profile). Further still, because age is dynamically determined upon each log-in to the media streaming service, the content that is available to the user can differ each log-in. For example, a first set of media content could be available for the user at a first age, a second set of media content could be available to the user at a second age, etc. This can allow a seamless transition of access to permitted content for users as they are aging.

In some embodiments, the method performed by the processor can include receiving a fingerprint from the user and analyzing the fingerprint using a discrete wavelet transform (DWT) and principle component analysis (PCA) to determine the age of the user. By using a DWT/PCA analysis on a fingerprint, secure and reliable age verification can be completed.

In some embodiments, the method performed by the processor can further comprise determining an identity of the user based on the comparison between the biometric sample and the biometric template, browsing social media to determine a social media profile corresponding to the identity of the user, and analyzing the social media profile to ascertain the age of the user. This can be completed such that age verification can be more accurately performed.

In some embodiments, the method performed by the processor can further comprise receiving, at a later time, a second biometric sample from the user, determining by analyzing the second biometric sample, that the user is a second age, and applying, based on the second age, a second access control to media content accessed through the media streaming service. This can be completed such that, as the age of the user changes over time, the content that the user can access changes. This enables a seamless transition of access control applied to streamed media content as users age.

Embodiments of the present disclosure also relate to a computer program product comprising a computer readable storage medium having program instructions embodied therewith, the program instructions executable by a processor to cause the processor to perform a method. The method performed by the processor can include receiving a log-in request to a media streaming service. The method performed by the processor can further include receiving a biometric sample can be received from a user. The method performed by the processor can further include comparing the biometric sample to a biometric template to determine whether the user is an authorized user. In response to determining the user is an authorized user, the method performed by the processor can include analyzing the biometric sample to determine an age of the user. The method performed by the processor can then include applying access control to media content accessed through the media streaming service based on the determined age of the user.

The above computer program product can provide several advantages. First, by comparing the biometric sample to a biometric template to determine whether the user is an authorized user, unauthorized users can be prevented from accessing the media streaming service. Further, by determining the age of the user based on biometric data, the user cannot bypass age restrictions as they could with conventional access control methodologies (e.g., by knowing a master password and/or accessing the content through a different user profile). Further still, because age is dynamically determined upon each log-in to the media streaming service, the content that is available to the user can differ each log-in. For example, a first set of media content could be available for the user at a first age, a second set of media content could be available to the user at a second age, etc. This can allow a seamless transition of access to permitted content for users as they are aging.

In some embodiments, the method performed by the processor can include receiving a fingerprint from the user and analyzing the fingerprint using a discrete wavelet transform (DWT) and principle component analysis (PCA) to determine the age of the user. By using a DWT/PCA analysis on a fingerprint, secure and reliable age verification can be completed.

In some embodiments, the method performed by the processor can further comprise determining an identity of the user based on the comparison between the biometric sample and the biometric template, browsing social media to determine a social media profile corresponding to the identity of the user, and analyzing the social media profile to ascertain the age of the user. This can be completed such that age verification can be more accurately performed.

In some embodiments, the method performed by the processor can further comprise receiving, at a later time, a second biometric sample from the user, determining by analyzing the second biometric sample, that the user is a second age, and applying, based on the second age, a second access control to media content accessed through the media streaming service. This can be completed such that, as the age of the user changes over time, the content that the user can access changes. This enables a seamless transition of access control applied to streamed media content as users age.

Embodiments of the present disclosure also relate to a computer-implemented method for applying access control to streamed media content. A log-in request to a media streaming service can be received from a user, the log-in request including a biometric sample of the user. A determination can be made that the biometric sample matches to a biometric template stored in a biometric template datastore associated with the media streaming service. In response to determining that the biometric sample matches to the biometric template stored in the biometric template datastore, the biometric sample can be analyzed to determine an age of the user. Access control can then be applied to media content accessed through the media streaming service based on the determined age of the user.

The above method can provide several advantages. First, by matching the biometric sample to a biometric template, unauthorized users can be prevented from accessing the media streaming service. Further, by determining the age of the user based on biometric data, the user cannot bypass age restrictions as they could with conventional access control methodologies (e.g., by knowing a master password and/or accessing the content through a different user profile). Further still, because age is dynamically determined upon each log-in to the media streaming service, the content that is available to the user can differ each log-in. For example, a first set of media content could be available for the user at a first age, a second set of media content could be available to the user at a second age, etc. This can allow a seamless transition of access to permitted content for users as they are aging. In contrast, previous methods would require manual intervention to expand access to additional content. For example, a child could only have access to "For Kids" content until they reach a particular age (e.g., 18), at which point all content could be unlocked.

In some embodiments, the method can include receiving a fingerprint from the user and analyzing the fingerprint using a discrete wavelet transform (DWT) and principle component analysis (PCA) to determine the age of the user. By using a DWT/PCA analysis on a fingerprint, secure and reliable age verification can be completed.

In some embodiments, the method can further comprise receiving, at a later time, a second biometric sample from the user, determining by analyzing the second biometric sample, that the user is a second age, and applying, based on the second age, a second access control to media content accessed through the media streaming service. This can be completed such that, as the age of the user changes over time, the content that the user can access changes. This enables a seamless transition of access control applied to streamed media content as users age.

Embodiments of the present disclosure also relate to a system. The system can include an authenticator configured to receive a log-in request to a media streaming service from a user, the log-in request including a fingerprint sample of the user. The authenticator is further configured to determine that the fingerprint sample matches to a fingerprint template stored in a biometric template datastore associated with the media streaming service. The system can further include an age determiner configured to analyze, in response to the authenticator determining that the fingerprint sample matches to the fingerprint template stored in the biometric template datastore, the fingerprint sample to determine an age of the user using a discrete wavelet transform (DWT) and principle component analysis (PCA). The system can further include a stream service controller configured to apply, based on the determined age of the user, access control to media content accessed through the media streaming service.

The above system can provide several advantages. First, by matching the biometric sample to a biometric template, unauthorized users can be prevented from accessing the media streaming service. Further, by determining the age of the user based on fingerprint data, the user cannot bypass age restrictions as they could with conventional access control methodologies (e.g., by knowing a master password and/or accessing the content through a different user profile). Further still, because age is dynamically determined upon each log-in to the media streaming service, the content that is available to the user can differ each log-in. For example, a first set of media content could be available for the user at a first age, a second set of media content could be available to the user at a second age, etc. This can allow a seamless transition of access to permitted content for users as they are aging. Further still, accurate and reliable age determination can be completed using DWT/PCA analysis on fingerprint samples.

In some embodiments, the authenticator can be configured to receive, at a later time, a second fingerprint sample from the user, the age determiner can be configured to analyze the second fingerprint sample using the discrete wavelet transform (DWT) and principle component analysis (PCA) to determine that the user is a second age, and the stream service controller can be configured to apply a second access control to media content accessed through the media streaming service based on the second age. This can be completed such that, as the age of the user changes over time, the content that the user can access changes. This enables a seamless transition of access control applied to streamed media content as users age.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of streamed media content, and more specifically, to applying access control to streamed media content. While the present disclosure is not necessarily limited to such applications, various aspects of the disclosure can be appreciated through a discussion of various examples using this context.

The rise in subscription media streaming services has given consumers seemingly endless media options. However, due to the sheer size of the media repositories, it's easy for children to stumble across inappropriate content. As a result, media streaming service providers have devised a variety of solutions to prevent children from watching inappropriate content. Some solutions include applying a master password to lock adult content. Some solutions include controlling access based on user profiles (e.g., adult profiles and children profiles), which may also be coupled with a password. However, in the case of passwords, if a child learns the password, they can watch any content through the service. In the case of user profiles, if a child signs into an adult user profile (by clicking on a parent's icon or by entering a learned password), they may also be allowed to watch any content.

Aspects of the present disclosure address the aforementioned complications via an access control system. The access control system can be configured to receive a biometric sample from a user. The biometric sample can be compared to a biometric template to determine whether the user is an authorized user. In response to determining that the user is an authorized user, the biometric sample can be analyzed to determine an age of the user. Access control can then be applied to media content accessed through the media streaming service based on the determined age.

Aspects of the present disclosure can provide several advantages. First, by comparing the biometric sample to a biometric template to determine whether the user is an authorized user, unauthorized users can be prevented from accessing the media streaming service. Further, by determining the age of the user based on biometric data, the user cannot bypass age restrictions as they could previously (e.g., by knowing a master password and/or accessing the content through a different user profile). Further still, because age is dynamically determined upon each log-in to the streaming service, and because access to media content is controlled based on age, the content that is available to the user can differ at each log-in. For example, a first set of media content could be available for the user at a first age, a second set of media content could be available to the user at a second age, etc. This can allow seamless transition of access to permitted content for users as they are aging. In contrast, previous methods would require manual intervention to expand access to additional content. For example, a child could only have access to "For Kids" content until they reach a particular age (e.g., 18), at which point all content could be unlocked.

Figure 1:
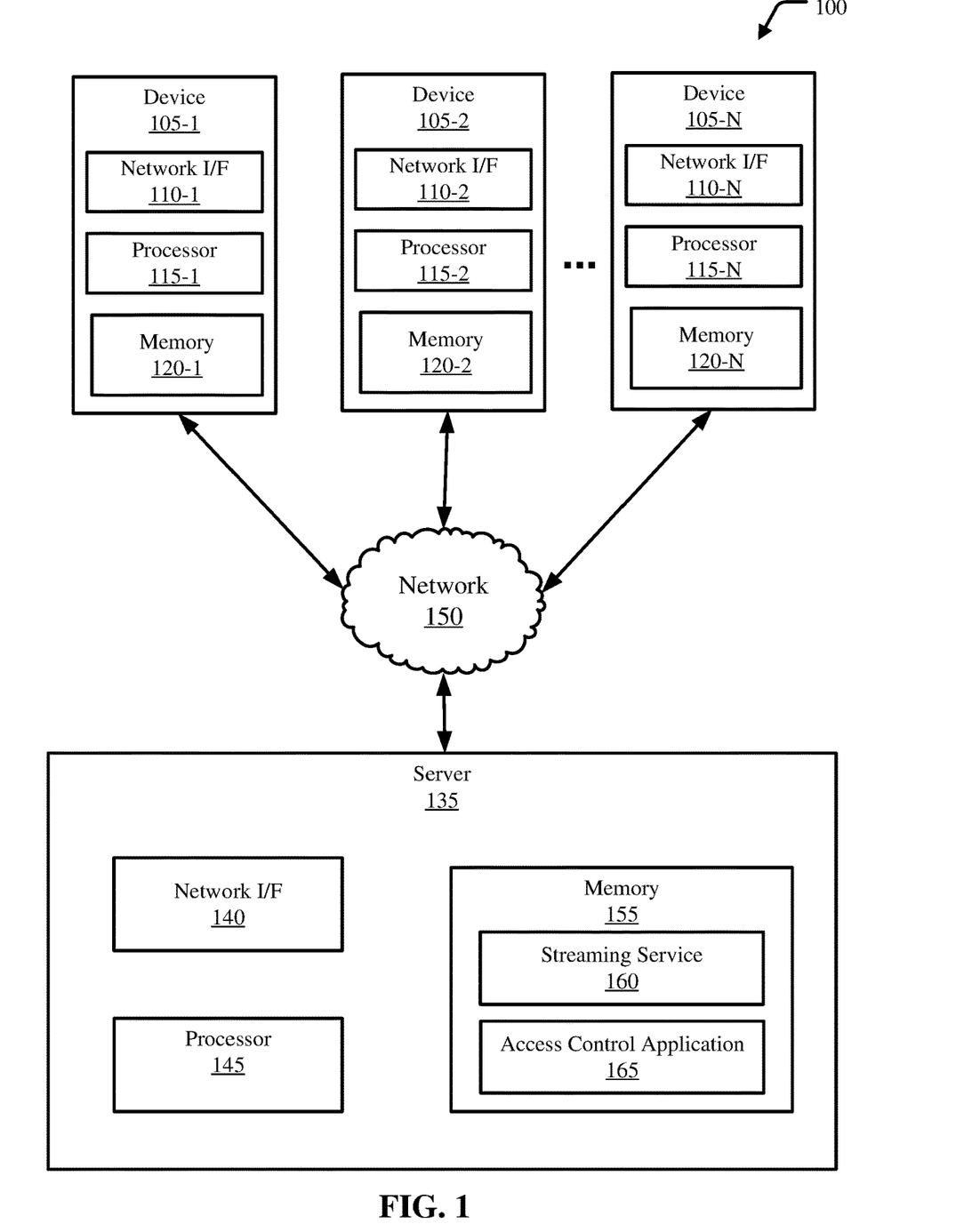
FIG. 1 is a block diagram illustrating an example computing environment in which illustrative embodiments of the present disclosure can be implemented.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively "devices 105"), at least one server 135, and a network 150.

Consistent with various embodiments, the server 135 and the devices 105 are computer systems (e.g., servers, desktops, laptops, or hand-held devices, etc.). The devices 105 and the server 135 include one or more processors 115-1, 115-2 . . . 115-N (collectively "processors 115") and 145 and one or more memories 120-1, 120-2 . . . 120-N (collectively "memories 120") and 155, respectively. The devices 105 and the server 135 can be configured to communicate with each other through internal or external network interfaces 110-1, 110-2 . . . 110-N (collectively "network interfaces 110") and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, biometric authentication software, etc.).

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 5.

The server 135 includes a streaming service 160 and an access control application 165. The access control application 165 can be configured to apply access control to media content transmitted by the streaming service 160. In embodiments, the access control application 165 can be configured to receive a biometric sample from a user. The biometric sample can be compared to a biometric template to determine whether the user is an authorized user. In response to determining that the user is authorized, the access control application 165 can be configured to determine an age of the user by analyzing the biometric sample. The access control application 165 can then apply access control to media content transmitted by the streaming service 160 based on the determined age. The access control is based on the determined age and the characteristics of media content (e.g., ratings, genres, classifications, etc.).

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary. For example, in some embodiments, the streaming service 160 and access control application 165 can be located on separate servers. In some embodiments, the access control application 165 may be integrated within the streaming service.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
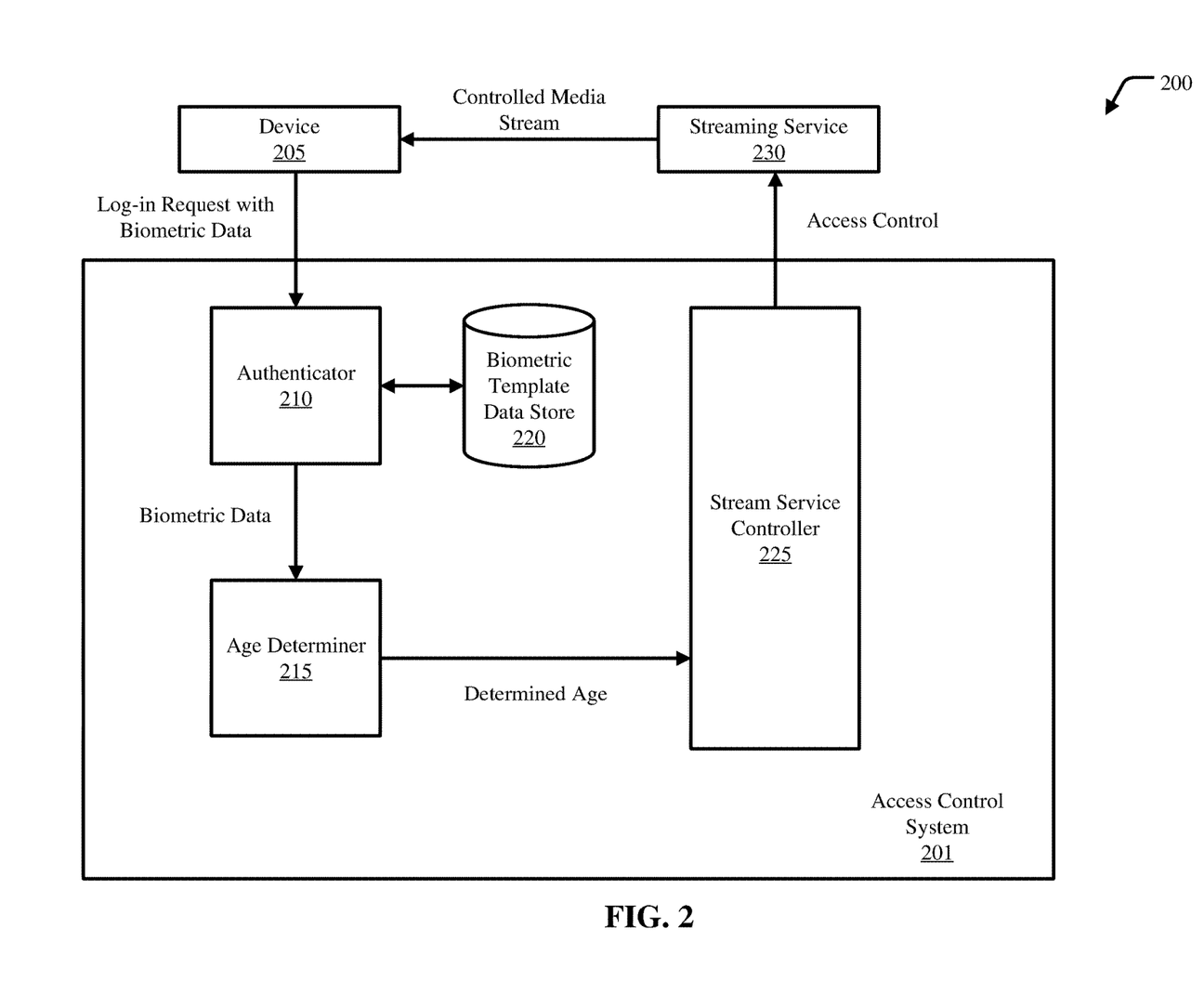
FIG. 2 is a block diagram illustrating an example computing environment including an access control system, in accordance with embodiments of the present disclosure.

Turning now to FIG. 2, illustrated is a block diagram of an example computing environment 200 in which illustrative embodiments of the present disclosure can be implemented. The computing environment 200 includes a device 205 (which can be the same as or similar to one of devices 105, shown in FIG. 1), an access control system 201, and a streaming service 230. The access control system 201 includes an authenticator 210, an age determiner 215, and a stream service controller 225. In embodiments, the authenticator 210, age determiner 215, and stream service controller 225 can be processor executable instructions that can be executed by a dedicated or shared processor using received inputs (e.g., from device 205).

Consistent with various embodiments, the authenticator 210 can be configured to receive log-in requests with biometric samples from users (e.g., user device 205). Biometric samples can include fingerprints, voice prints, facial samples, iris patterns, vein patterns, and other biometric indicators. A biometric scanner (e.g., a fingerprint scanner, camera, microphone) can be configured to collect a biometric sample from a user. Upon collection, the biometric sample(s) are transmitted to the authenticator 210.

The biometric sample(s) can be used to generate biometric templates for respective users. A biometric template is a collection of readings for a given user obtained through an enrollment process (in which the user presents several biometric readings). In embodiments, the biometric templates can be converted into a binary representation and stored in a secure format (e.g., a hash) in a biometric template datastore 220. Any suitable biometric features can be used to generate a biometric template, including, but not limited to, fingerprints, voice prints, facial samples, iris patterns, and vein patterns. In embodiments, the implemented biometric feature used for authentication is also used for age determination by the age determiner 215.

After template enrollment, the user can present a biometric sample to the authenticator 210 and the authenticator 210 can be configured to compare the sample to an existing template. Biometric samples can be compared to biometric templates in any suitable manner. Algorithms and/or techniques used for comparison can depend on the collected biometric data. For example, facial recognition algorithms (e.g., 3-Dimensional recognition based on facial shape, skin texture analysis, thermal imaging analysis, feature/landmark extraction and comparison, etc.) can be used to compare facial samples and facial templates. As another example, fingerprint matching algorithms (e.g., pattern recognition, minutia comparison, etc.) can be used to compare fingerprint samples and fingerprint templates. As another example, voice recognition algorithms (e.g., dynamic time warping, neural networks, hidden Markov models) can be used to compare voice prints and voice templates.

If the sample matches to an existing template (e.g., exceeds a match certainty threshold, a minutia feature of the sample matches a minutia feature of the template, etc.), then the user is determined to be an authorized user. If the sample does not match to an existing template (e.g., falls below a match certainty threshold, has no matching minutia features, etc.), then the user can be determined to be an unauthorized user. In embodiments, unauthorized users are prevented from accessing the streamed media service.

If the user is authorized by the authenticator 210, then the user's biometric data (e.g., which can be the same sample transmitted to the authenticator 210 or, alternatively, a new biometric sample) is transmitted to the age determiner 215. The age determiner 215 can be configured to determine an age of the user by analyzing the biometric sample. In some embodiments, the age determiner 215 can be configured to determine an age range (e.g., 4-7, 5-9, 10-14, etc.) for a user.

Various algorithms can be used to determine age based on a biometric sample. The implemented age determination algorithm(s) can depend on the collected biometric data. For example, for facial samples (i.e., an image of a user's face), a deep convolutional neural network (CNN) in conjunction with a divide-and-rule strategy can be used to determine age. As another example, for facial samples, features can be extracted from facial images (e.g., wrinkles) and each face image can be clustered using a clustering algorithm (e.g., fuzzy c-means clustering) depending on the extracted features (e.g., the number/placement of wrinkles). These methods can reliably predict age using only input images of faces. Any suitable method of determining age based on a facial image can be implemented, including, but not limited to, anthropometric data, active appearance model (AAM) parameters, aging pattern substance, manifold learning, appearance features, or any combination thereof.

In embodiments where fingerprint data is collected, a discrete wavelet transform (DWT)/principle component analysis (PCA) feature extraction algorithm can be used for age determination. In embodiments, features such as ridge count, ridge thickness to valley thickness count ratio (RTVTR), white lines count, ridge count asymmetry, and pattern type concordance can be extracted for age classification. In some embodiments, a neural network can be used for classification using dominant features extracted from fingerprints. However, any suitable method can be used to determine age based on fingerprint data. For example, K-nearest neighbor (KNN) and learning vector quantization (LVQ) can also be used to estimate age using a fingerprint sample.

In embodiments where voice data is collected, tonal, pitch, and amplitude characteristics of the voice data can be analyzed to determine age. Example algorithms which can be used to determine age based on voice characteristics include gaussian mixture models (GMMs), hidden Markov models (HMMs), and/or support vector machines (SVMs).

In some embodiments, an identity of a user (as determined by the authenticator 210) can be leveraged to aid in ascertaining age. For example, the identity of the user can be used to search applicable social media and/or other online data to identify clues indicative of age. For example, if an age range of 7-14 is determined by the age determiner 210, the access control system 201 may require further analyzation to narrow down the age range. This is because the content suitable for a 14-year-old may not be suitable for a 7-year-old. In this example, the access control system 201 can be configured to browse online data to identify clues indicative of age, for example, a social media profile. Based on an analysis of the social media profile of the user (e.g., using natural language processing techniques), a determination can be made that the user is 12 years old. For example, the age can be determined based on text extracted from a course syllabus (e.g., text such as "$7^{th}$ Grade" or "Middle School") posted on their social media profile.

Upon determining the age of the user, the determined age (or age range) is transmitted to the stream service controller 225. The stream service controller 225 can be configured to apply restrictions (i.e., apply control) to media content transmitted by the streaming service 230. The stream service controller 225 uses the age as a baseline for the restrictions applied to the media content. In embodiments, all media content is pre-classified with recommended age requirements such that media content can be restricted based on the recommended age requirements. In some embodiments, viewership categories are blocked based on a determined age. For example, if a determined age of a user is 10 years old, all content which is PG-13 and up (e.g., PG-13, R-rated, NC-17) can be restricted. As another example, if a determined age of a user is 5, only G-rated media may be available to the user.

Media can be restricted based on any suitable age requirement. For example, a first set of media content may be available to a 10-year-old child, a second set of media content may be available to an 11-year-old, and a third set of media content may be available to a 12-year-old. The types of content available at different ages can be manually selected and set by an administrator (e.g., a parent). For example, a parent can designate a first set of content as permitted for a child when they are 8 years old, a second set of content as permitted when they are 12 years old, and a third set of content as permitted when they are 16 years old.

The sets of media content can be controlled based on media classification (e.g., genres), individual media items (e.g., episodes), media series (e.g., tv shows), etc.

Upon applying access control to the streaming service 230, the streaming service 230 can transmit media content permitted by the access control system 201 to the device 205. In some embodiments, the streaming service 230 transmits all media content to the device 205 but blocks access to restricted media content. In some embodiments, the streaming service 230 only transmits content which is determined to be appropriate for the user. The access control system 201 can then await future user log-in requests.

In some embodiments, the access control system 201 can apply access control to media content transmitted from the streaming service 230 to multiple devices simultaneously. For example, if a first and second user request to view media content through the streaming service 230 from a first and second device, respectively, the access control system 201 can be configured to apply access control to the content transmitted to the first and second devices based on a determined age of the first and second user simultaneously.

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary. For example, although not shown in FIG. 2, the access control system 201 can be integrated within the streaming service 230.

Figure 3:
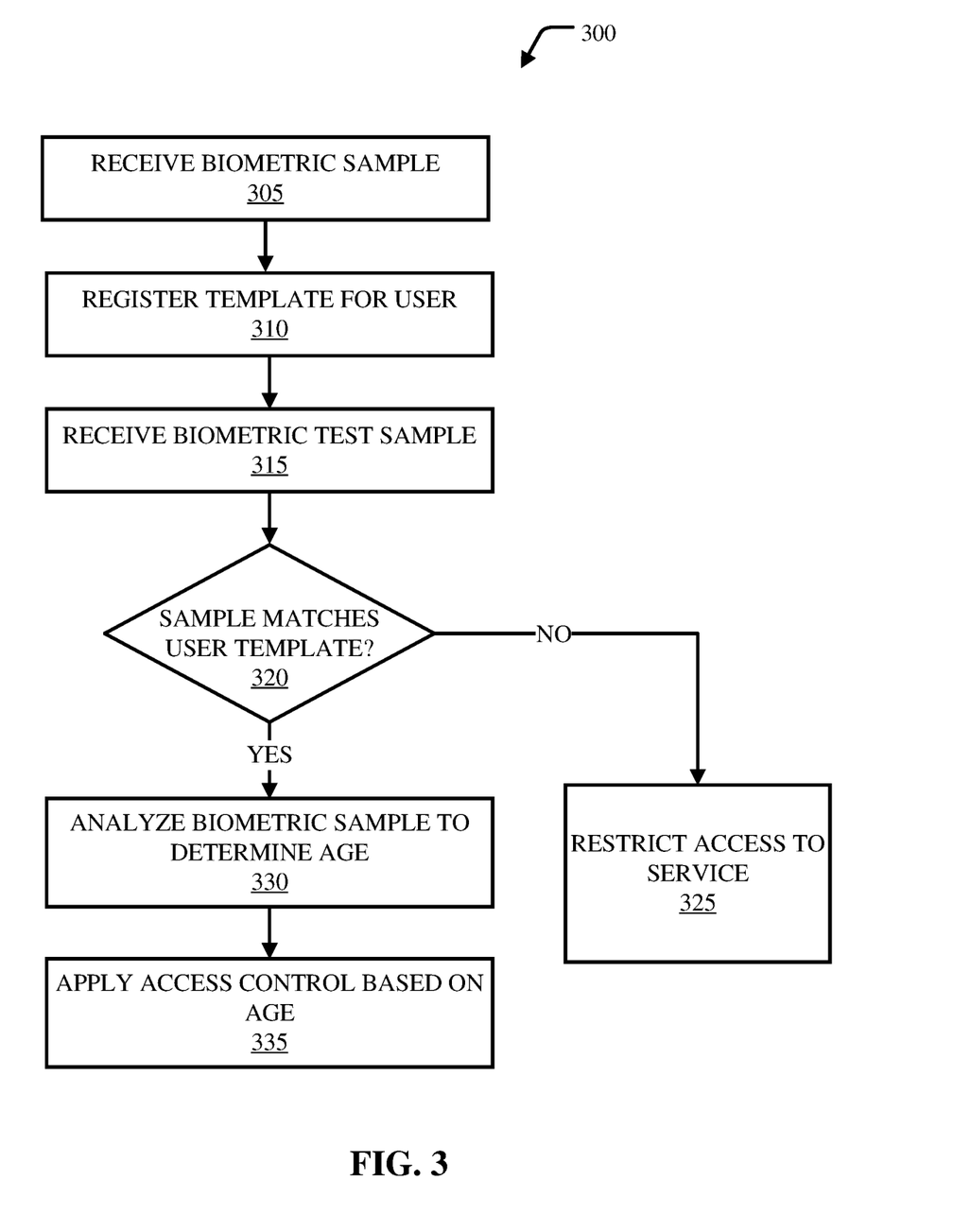
FIG. 3 is flow-diagram illustrating an example method for applying access control to streamed media content, in accordance with embodiments of the present disclosure.

FIG. 3 is a flow diagram illustrating an example method 300 for applying access control to streamed media content, in accordance with embodiments of the present disclosure. Method 300 initiates at operation 305, where one or more biometric samples are received from a user. The biometric samples can be collected using a biometric scanner. The biometric samples can be used to generate a biometric template for the user. Any suitable biometric data can be collected, including fingerprints, iris pattern, voice prints, facial samples, and the like.

A biometric template is then registered (i.e., stored) for the user. This is illustrated at operation 310. The biometric template can be generated through an enrollment process with the user, where the one or more biometric samples are digitized and stored as a "password" for the user. In embodiments, particular features of the biometric samples (i.e., extracted features) are stored within the template. For example, particular ridges and valleys in a fingerprint can be identified across multiple fingerprint readings and stored within the biometric template, to be used as unique features to identify the user in the future. The biometric template can be stored in a secure format, such as a hash representation. In some embodiments, an error tolerant, yet secure biometric authentication method, such as fuzzy commitment, can be implemented to retain concealing and binding properties of the stored biometric template while allowing some variation between samples during test time.

A biometric sample is then received from the user. This is illustrated at operation 315. The biometric sample can be received as a part of a future log-in request to a streaming service. The biometric sample can be received over a network (e.g., from a fingerprint scanner of a mobile device transmitted over a secure communication channel).

A determination is made whether the biometric sample matches a user template. This is illustrated at operation 320. In embodiments, the sample is compared against various biometric templates corresponding to each registered user until a match is found. Matching can be completed using the algorithms described with respect to the authenticator 210 of FIG. 2. For example, a facial recognition algorithm can be implemented for facial samples, a fingerprint matching algorithm can be implemented for fingerprint samples, a speech recognition algorithm can be implemented for voice prints, etc. In embodiments, a match is determined in response to a match certainty exceeding a threshold.

If a determination is made that the sample does not match to any registered biometric templates, then method 300 proceeds to operation 325, where access is restricted to the streaming service. This can be completed such that only authorized users are permitted to access the streaming service. For example, it is common for users to sign into streaming services from multiple devices, including devices owned by unauthorized users. In this situation, if an unauthorized user attempts to access the streaming service from their device (that the authorized user previously signed into), they can be required to input a biometric sample to gain access. Upon receiving a biometric sample from the unauthorized user (if provided), the unauthorized user can be prevented from accessing the streaming service.

If a determination is made that the sample does match to a biometric template, then the biometric sample is analyzed to determine an age of the user. This is illustrated at operation 330. The biometric sample can be analyzed to determine age using the same, or substantially similar, techniques described with respect to the age determiner 215 of FIG. 2. For example, a deep convolutional neural network can be used to determine age based on facial samples, a DWT/PCA feature extraction algorithm can be used to determine age based on fingerprint samples, a GMM can be used to determine age based on voice prints, etc.

Access control is then applied based on the determined age. This is illustrated at operation 335. Access control can include prohibiting the user from viewing any media content which is inappropriate for their age. Content deemed inappropriate can be configured by an administrator (e.g., a parent) and/or based on an established rating system (e.g., G-rated, "For Kids" classification, etc.). Applying access control can include not transmitting (or blocking access to) any content which is deemed inappropriate for the user.

The aforementioned operations can be completed in any order and are not limited to those described. Additionally, some, all, or none of the aforementioned operations can be completed, while still remaining within the spirit and scope of the present disclosure.

Figure 4:
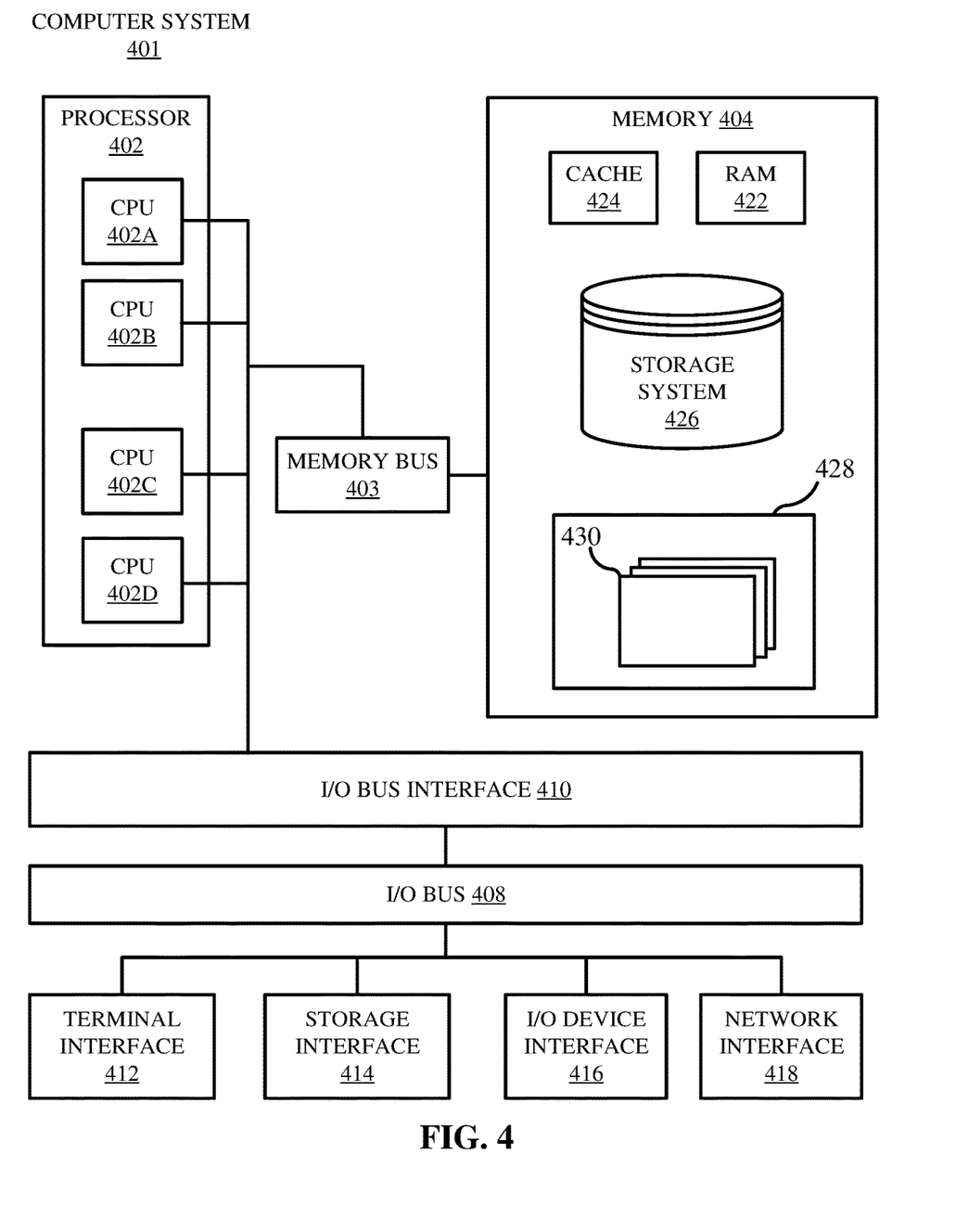
FIG. 4 is a high-level block diagram illustrating an example computer system that can be used in implementing one or more of the methods, tools, and modules, and any related functions described herein, in accordance with embodiments of the present disclosure.

Referring now to FIG. 4, shown is a high-level block diagram of an example computer system 401 that may possibly be utilized in various devices discussed herein (e.g., devices 105, server 135, device 205, access control system 201) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402 (also referred to as processors herein), a memory 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

Memory 404 may include computer system readable media in the form of volatile memory, such as random-access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

In some embodiments, the program modules 430 of the computer system 401 include an access control module. The access control module can be configured to a receive a log-in request to a media streaming service. The access control module can be configured to receive a biometric sample from a user. The access control module can be configured to compare the biometric sample to a biometric template to determine whether the user is an authorized user, and in response to determining that the user is an authorized user, the access control module can be configured to analyze the biometric sample to determine an age of the user. Access control can then be applied to media content accessed through the media streaming service based on the age of the user.

Although the memory bus 403 is shown in FIG. 4 as a single bus structure providing a direct communication path among the CPUs 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
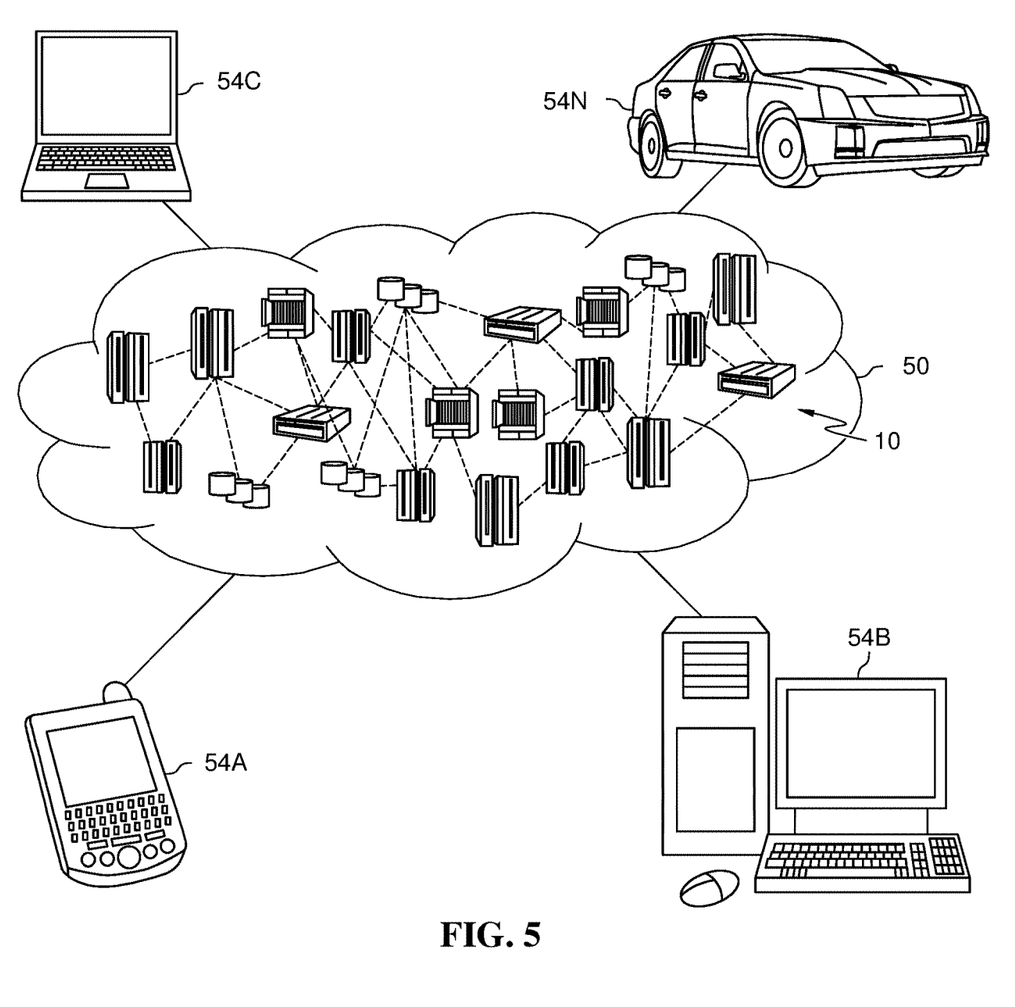
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105, device 205), desktop computer 54B (e.g., server 135, access control system 201), laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
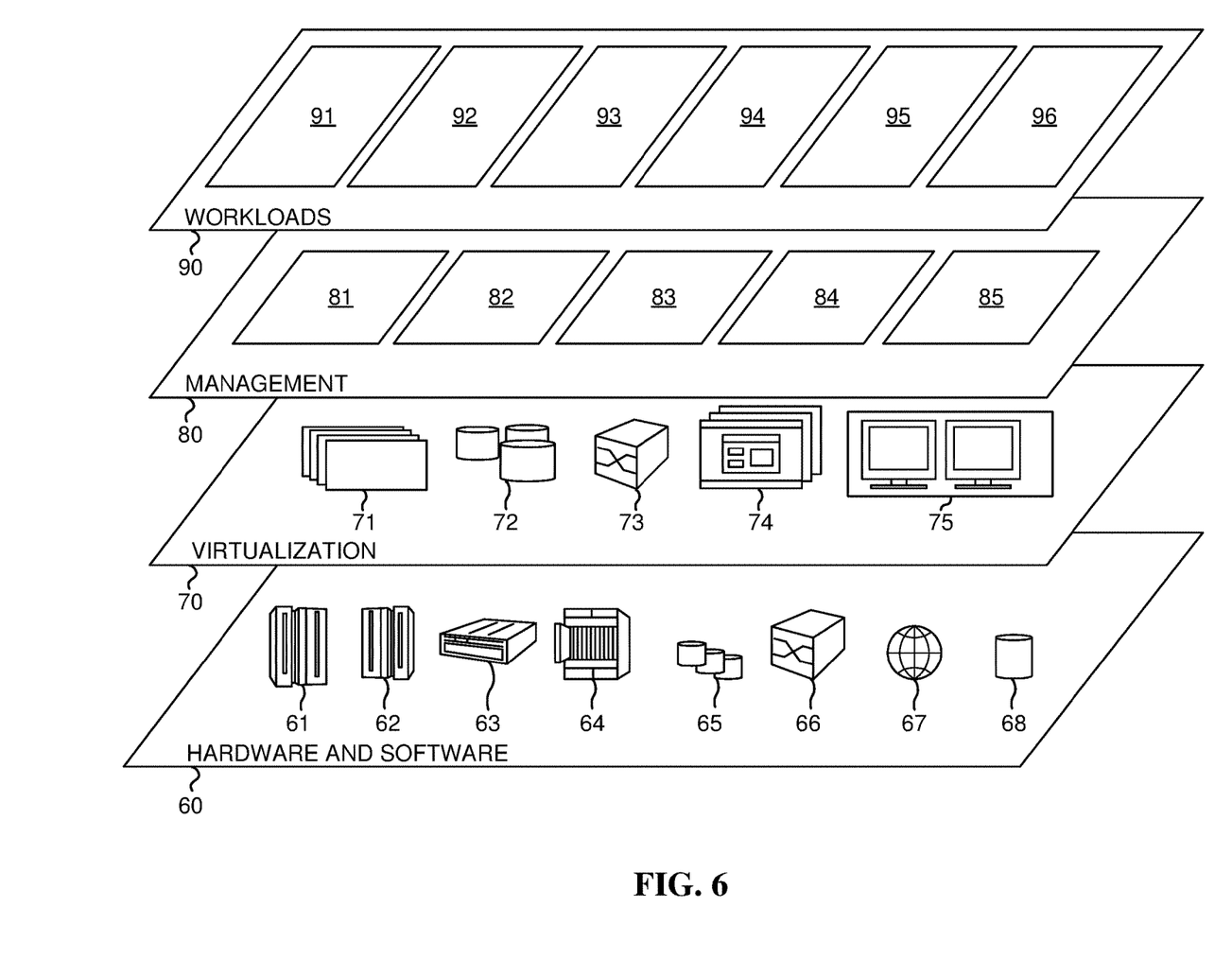
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and access control 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Several examples will now be provided to further clarify various aspects of the present disclosure.

Example 1: A method comprising receiving a log-in request to a media streaming service. The method further comprises receiving a biometric sample from a user and comparing the biometric sample to a biometric template to determine whether the user is an authorized user. The method further comprises analyzing, in response to determining that the user is an authorized user, the biometric sample to determine an age of the user. The method further comprises applying, based on the determined age of the user, access control to media content accessed through the media streaming service.

Example 2: The limitations of Example 1, wherein the biometric sample is a fingerprint, wherein the fingerprint is analyzed using a discrete wavelet transform (DWT) and principle component analysis (PCA) to determine the age of the user.

Example 3: The limitations of Example 1, wherein the biometric sample is a facial sample, wherein the facial sample is analyzed using a deep convolutional neural network to determine the age of the user.

Example 4: The limitations of any of Examples 1-3, wherein, upon analyzing the biometric sample to determine the age of the user, the method further includes determining an identity of the user based on the comparison between the biometric sample and the biometric template, browsing social media data to determine a social media profile corresponding to the identity of the user, and analyzing the social media profile to ascertain an age of the user.

Example 5: The limitations of any of Examples 1-4, wherein the method further comprises receiving, at a later time, a second biometric sample from the user, determining, by analyzing the second biometric sample, that the user is a second age, and applying, based on the second age, a second access control to media content accessed through the media streaming service.

Example 6: The limitations of any of Examples 1-5, wherein the method further comprises receiving a second biometric sample from a second user, comparing the second biometric sample to the biometric template to determine whether the second user is an authorized user, and blocking, in response to determining that the second user is an authorized user, access to the media streaming service for the second user.

Example 7: The limitations of any of Examples 1-6, wherein the biometric sample is received as a part of the log-in request to the media streaming service.

Example 8: A system comprising a memory storing program instructions and a processor configured to execute the program instructions to perform a method comprising receiving a log-in request to a media streaming service. The method performed by the processor further comprises receiving a biometric sample from a user and comparing the biometric sample to a biometric template to determine whether the user is an authorized user. The method performed by the processor further comprises analyzing, in response to determining that the user is an authorized user, the biometric sample to determine an age of the user. The method performed by the processor further comprises applying, based on the determined age of the user, access control to media content accessed through the media streaming service.

Example 9: A system comprising a processor and a computer-readable storage medium storing program instructions which, when executed by the processor, are configured to cause the processor to perform a method according to any of Examples 1-8.

Example 10: A computer program product comprising a computer readable storage medium having program instructions embodied therewith, the program instructions executable by a processor to cause the processor to perform a method according to any one of Examples 1-8.

Example 11: A computer-implemented method comprising receiving a log-in request to a media streaming service from a user, the log-in request including a biometric sample of the user. The method further comprises determining that the biometric sample matches to a biometric template stored in a biometric template datastore associated with the media streaming service. The method further comprising, applying, based on the determined age of the user, access control to media content accessed through the media streaming service.

Example 12: The limitations of Example 1, wherein the biometric sample is a fingerprint, wherein the fingerprint is analyzed using a discrete wavelet transform (DWT) and principle component analysis (PCA) to determine the age of the user.

Example 13: The limitations of any one of Examples 11-12, wherein the method further comprises receiving, at a later time, a second biometric sample from the user, determining, by analyzing the second biometric sample, that the user is a second age, and applying, based on the second age, a second access control to media content accessed through the media streaming service.

Example 14: A system comprising an authenticator configured to receive a log-in request to a media streaming service from a user, the log-in request including a fingerprint sample of the user, wherein the authenticator is further configured to determine that the fingerprint sample matches to a fingerprint template stored in a biometric template datastore associated with the media streaming service. The system further comprises an age determiner configured to analyze, in response to the authenticator determining that the fingerprint sample matches to the fingerprint template stored in the biometric template datastore, the fingerprint sample to determine an age of the user using a discrete wavelet transform (DWT) and principle component analysis (PCA). The system further comprises a stream service controller configured to apply, based on the determined age of the user, access control to media content accessed through the media streaming service.

Example 15: The limitations of Example 14, where wherein the authenticator is configured to receive, at a later time, a second fingerprint sample from the user, wherein the age determiner is configured to analyze the second fingerprint sample using the discrete wavelet transform (DWT) and principle component analysis (PCA) to determine that the user is a second age, and wherein the stream service controller is configured to apply a second access control to media content accessed through the media streaming service based on the second age.

What is claimed is:

1. A method comprising:
receiving a log-in request to a media streaming service at a first time;
receiving a biometric sample from a user;
comparing the biometric sample to a biometric template to determine whether the user is an authorized user;
analyzing, in response to determining that the user is an authorized user, the biometric sample to determine a first age of the user at the first time;
applying, based on the determined first age of the user, a first access control to media content accessed through the media streaming service;
receiving a second biometric sample from the user at a second time, the second time later than the first time;
determining, by analyzing the second biometric sample, a second age of the user at the second time; and
applying, based on the determined second age of the user, a second access control to media content accessed through the media streaming service, the second access control expanding access to media content accessed through the media streaming service as compared to the first access control based on the second age being greater than the first age.

2. The method of claim 1, wherein the biometric sample is a fingerprint, wherein the fingerprint is analyzed using a discrete wavelet transform (DWT) and principle component analysis (PCA) to determine the first age of the user.

3. The method of claim 1, wherein the biometric sample is a facial sample, wherein the facial sample is analyzed using a deep convolutional neural network to determine the first age of the user.

4. The method of claim 1, wherein, upon analyzing the biometric sample to determine the first age of the user, the method further comprises:
determining an identity of the user based on the comparison between the biometric sample and the biometric template;
browsing social media data to determine a social media profile corresponding to the identity of the user; and
analyzing the social media profile to ascertain the first age of the user.

5. The method of claim 1, wherein the biometric sample is received as a part of the log-in request to the media streaming service.

6. A system comprising:
a memory storing program instructions; and
a processor, wherein the processor is configured to execute the program instructions to perform a method comprising:
receiving a log-in request to a media streaming service at a first time;
receiving a biometric sample from a user;
comparing the biometric sample to a biometric template to determine whether the user is an authorized user;
analyzing, in response to determining that the user is an authorized user, the biometric sample to determine a first age of the user at the first time;
applying, based on the determined first age of the user, a first access control to media content accessed through the media streaming service;
receiving a second biometric sample from the user at a second time, the second time later than the first time;
determining, by analyzing the second biometric sample, a second age of the user at the second time; and
applying, based on the determined second age of the user, a second access control to media content accessed through the media streaming service, the second access control expanding access to media content accessed through the media streaming service as compared to the first access control based on the second age being greater than the first age.

7. The system of claim 6, wherein the biometric sample is a fingerprint, wherein the fingerprint is analyzed using a discrete wavelet transform (DWT) and principle component analysis (PCA) to determine the first age of the user.

8. The system of claim 6, wherein the biometric sample is a facial sample, wherein the facial sample is analyzed using a deep convolutional neural network to determine the first age of the user.

9. The system of claim 6, wherein, upon analyzing the biometric sample to determine the first age of the user, the method performed by the processor further comprises:
determining an identity of the user based on the comparison between the biometric sample and the biometric template;
browsing social media data to determine a social media profile corresponding to the identity of the user; and
analyzing the social media profile to ascertain the first age of the user.

10. The system of claim 6, wherein the biometric sample is received as a part of the log-in request to the media streaming service.

11. A computer program product comprising a computer readable storage medium having program instructions embodied therewith, the program instructions executable by a processor to cause the processor to perform a method comprising:
- receiving a log-in request to a media streaming service at a first time;
- receiving a biometric sample from a user;
- comparing the biometric sample to a biometric template to determine whether the user is an authorized user;
- analyzing, in response to determining that the user is an authorized user, the biometric sample to determine a first age of the user at the first time; and
- applying, based on the determined first age of the user, a first access control to media content accessed through the media streaming service;
- receiving a second biometric sample from the user at a second time, the second time later than the first time;
- determining, by analyzing the second biometric sample, a second age of the user at the second time;
- applying, based on the determined second age of the user, a second access control to media content accessed through the media streaming service, the second access control expanding access to media content accessed through the media streaming service as compared to the first access control based on the second age being greater than the first age.

12. The computer program product of claim 11, wherein the biometric sample is a fingerprint, wherein the fingerprint is analyzed using a discrete wavelet transform (DWT) and principle component analysis (PCA) to determine the first age of the user.

13. The computer program product of claim 11, wherein, upon analyzing the biometric sample to determine the first age of the user, the method performed by the processor further comprises:
- determining an identity of the user based on the comparison between the biometric sample and the biometric template;
- browsing social media data to determine a social media profile corresponding to the identity of the user; and
- analyzing the social media profile to ascertain the first age of the user.

14. The computer program product of claim 11, wherein the biometric sample is received as a part of the log-in request to the media streaming service.

15. A computer-implemented method comprising:
- receiving a log-in request to a media streaming service from a user at a first time, the log-in request including a biometric sample of the user;
- determining that the biometric sample matches to a biometric template stored in a biometric template datastore associated with the media streaming service;
- analyzing, in response to determining that the biometric sample matches to the biometric template stored in the biometric template datastore, the biometric sample to determine a first age of the user at the first time;
- applying, based on the determined first age of the user, a first access control to media content accessed through the media streaming service;
- receiving a second biometric sample from the user at a second time, the second time later than the first time;
- determining, by analyzing the second biometric sample, a second age of the user at the second time; and
- applying, based on the determined second age of the user, a second access control to media content accessed through the media streaming service, the second access control expanding access to media content accessed through the media streaming service as compared to the first access control based on the second age being greater than the first age.

16. The method of claim 15, wherein the biometric sample is a fingerprint, wherein the fingerprint is analyzed using a discrete wavelet transform (DWT) and principle component analysis (PCA) to determine the first age of the user.

17. A system comprising:
- an authenticator configured to receive a log-in request to a media streaming service from a user at a first time, the log-in request including a fingerprint sample of the user, wherein the authenticator is further configured to determine that the fingerprint sample matches to a fingerprint template stored in a biometric template datastore associated with the media streaming service;
- an age determiner configured to analyze, in response to the authenticator determining that the fingerprint sample matches to the fingerprint template stored in the biometric template datastore, the fingerprint sample to determine a first age of the user at the first time using a discrete wavelet transform (DWT) and principle component analysis (PCA); and
- a stream service controller configured to apply, based on the determined first age of the user, a first access control to media content accessed through the media streaming service;
- wherein the authenticator is further configured to receive a second biometric sample from the user at a second time, the second time later than the first time;
- wherein the age determiner is further configured to determine, by analyzing the second biometric sample, a second age of the user at the second time;
- wherein the stream service controller is further configured to apply, based on the determined second age of the user, a second access control to media content accessed through the media streaming service, the second access control expanding access to media content accessed through the media streaming service as compared to the first access control based on the second age being greater than the first age.

* * * * *